US010819522B1

(12) United States Patent
Roy et al.

(10) Patent No.: US 10,819,522 B1
(45) Date of Patent: Oct. 27, 2020

(54) SYSTEMS AND METHODS OF AUTHENTICATION USING ENTROPIC THRESHOLD

(71) Applicant: BlockGen Corp., Boca Raton, FL (US)

(72) Inventors: William Roy, Boca Raton, FL (US); Timothy McLean, Boca Raton, FL (US)

(73) Assignee: BlockGen Corp., Boca Raton, FL (US)

( * ) Notice: Subject to any disclaimer, the term of this patent is extended or adjusted under 35 U.S.C. 154(b) by 0 days.

(21) Appl. No.: 16/734,071

(22) Filed: Jan. 3, 2020

(51) Int. Cl.
*H04L 9/32* (2006.01)
*H04L 9/14* (2006.01)
*H04L 9/08* (2006.01)

(52) U.S. Cl.
CPC .......... *H04L 9/3226* (2013.01); *H04L 9/0863* (2013.01); *H04L 9/14* (2013.01); *H04L 9/3213* (2013.01); *H04L 9/3218* (2013.01)

(58) Field of Classification Search
CPC ....... H04L 9/3226; H04L 9/0863; H04L 9/14; H04L 9/3213; H04L 9/3218
See application file for complete search history.

(56) References Cited

U.S. PATENT DOCUMENTS

| 9,137,238 | B1* | 9/2015 | Jakobsson | H04W 12/06 |
| 2002/0112168 | A1* | 8/2002 | Filipi-Martin | H04L 63/061 |
| | | | | 713/183 |
| 2003/0105959 | A1* | 6/2003 | Matyas, Jr. | G06F 21/6245 |
| | | | | 713/168 |
| 2007/0124321 | A1* | 5/2007 | Szydlo | G06F 21/31 |
| 2013/0136033 | A1* | 5/2013 | Patil | H04L 41/145 |
| | | | | 370/255 |
| 2014/0032691 | A1* | 1/2014 | Barton | G06F 21/604 |
| | | | | 709/206 |
| 2014/0140508 | A1* | 5/2014 | Kamath | H04L 9/0869 |
| | | | | 380/255 |
| 2014/0143548 | A1* | 5/2014 | Wang | H04L 9/0897 |
| | | | | 713/171 |
| 2014/0279516 | A1* | 9/2014 | Rellas | G06Q 30/0185 |
| | | | | 705/44 |

(Continued)

OTHER PUBLICATIONS

Ellison et al, Protecting Secret Keys with Personal Entropy (Year: 1999).*
NPL Search (Google Scholar) (Year: 2020).*

*Primary Examiner* — Mahfuzur Rahman
*Assistant Examiner* — Richard W Cruz-Franqui
(74) *Attorney, Agent, or Firm* — Foley & Lardner LLP

(57) ABSTRACT

Disclosed herein are embodiments of systems, methods, and products for authentication using entropic threshold. A server may require a user to create a series of security questions to which only the user has the answers. The answers to the security questions may satisfy an entropic threshold. Based on the answers to the security questions, the client device may generate a passphrase and encrypt the user's private key based on the passphrase. The server may also store the encrypted private key and the series of security questions into a database. When the user tries to access the private key, the server may send the user's security questions and encrypted private key. The client device may require the user to provide the answer to each security question. When the client device receives answers to all security questions, the client device may use the resulting passphrase to decrypt the user's encrypted private key.

20 Claims, 15 Drawing Sheets

(56) References Cited

U.S. PATENT DOCUMENTS

| | | | |
|---|---|---|---|
| 2015/0095028 A1* | 4/2015 | Karpey | G10L 17/24 |
| | | | 704/246 |
| 2016/0019378 A1* | 1/2016 | Chan | G06F 21/36 |
| | | | 726/5 |
| 2016/0275480 A1* | 9/2016 | Sanaboyina | G06Q 20/3274 |
| 2016/0349999 A1* | 12/2016 | Adler | G06F 3/065 |
| 2017/0302459 A1* | 10/2017 | Fenner | H04L 9/0819 |
| 2019/0012445 A1* | 1/2019 | Lesso | G10K 11/17823 |
| 2019/0014097 A1* | 1/2019 | Hwang | H04L 63/08 |
| 2019/0027152 A1* | 1/2019 | Huang | G10L 21/0208 |
| 2019/0149524 A1* | 5/2019 | Bankston | H04L 9/3247 |
| | | | 726/26 |
| 2019/0245688 A1* | 8/2019 | Patin | H04L 9/0637 |
| 2019/0259030 A1* | 8/2019 | Burger | G06Q 10/0635 |
| 2019/0280883 A1* | 9/2019 | Fenner | H04L 9/0819 |

* cited by examiner

The application establishes an entropic threshold based upon a request to protect one or more private keys 202

The server requests user to input a series of created security questions 204

A client device receives each security question and the corresponding answer and transmits the security questions to the server, where each answer corresponds to an entropy score, and a total entropy score of the answers is a sum of the entropy score of each answer 206

The client device generates a passphrase based on the answers whose total entropy score satisfies the entropic threshold, encrypts the private keys based on the passphrase, and transmits the encrypted private keys to the server 208

The server receives a request to access the private keys 210

The server transmits the security questions and the encrypted private keys to the client device 212

The client device decrypts the encrypted private keys using the passphrase based on the answers to the security questions entered on the client device 214

Mortgage Blockchain Users

1102 — 1. Open Block+Sovereign app

1104 — 2. User answers 3 account locator questions

1106 — 3. Program uses answers from account locator questions to decrypt the user's encrypted blockchain key which resides on their device 1108 — 4. The user's blockchain key is used to sign transactions on the mortgage blockchain enabling data to be encrypted and inserted onto the chain or conversely decrypted and extracted from the chain much the same way a bitcoin user sends and receives coins on the bitcoin blockchain

Bitcoin Users

1202 — 1. Open Block+Sovereign App

1204 — 2. Insert password

1206 — 3. Program uses password to decrypt the user's encrypted blockchain key which resides on their device 1208 — 4. The blockchain key is used to access the bitcoin blockchain

SYSTEMS AND METHODS OF AUTHENTICATION USING ENTROPIC THRESHOLD

TECHNICAL FIELD

This application relates generally to systems and methods of authentication using entropic threshold.

BACKGROUND

Private keys are fundamental security ingredients in cryptosystems, applications and protocols assuring the confidentiality and authenticity of electronic communications and data storage. In the context of blockchain, the ownership of content on a blockchain is secured through private key technology and used extensively in the crypto currency eco system. Private keys utilize asymmetric cryptography to generate digital signatures, which provide the digital fingerprint, and proof of ownership required to send and receive information on a blockchain. These signatures can only be produced by someone who has the knowledge of or access to a private key. Private keys serve as the foundation for blockchain technology and decentralization.

Conventional methods for securing private keys may recommend creating private keys on an end user's client device. The conventional methods also recommend printing the private keys on a piece of paper or preferably stamping the private keys onto a metal plate and storing the piece of paper or steel plate in a bank vault for safe keeping. Such conventional methods for securing private keys are called "cold storage," which use a concept called "paper wallets." A paper wallet is simply a private key printed on a piece of paper. In a properly constructed paper wallet, a user's private key is generated offline and never stored on any computer system connected to the Internet.

However, the conventional methods for securing private keys may have encountered a set of technical challenges. For instance, one of the underlying principles behind blockchain technology is a concept called self-custody. Specifically, owners of crypto currency are responsible for safeguarding their private keys. The primary disadvantage of a paper wallet in the conventional methods is the vulnerability of theft, damage or loss. A thief who gains access to a user's private key may take a photo of the private key and then take control of whatever the private key is cryptographically linked to on the blockchain, such as money or data. In order to overcome the threat of lost or stolen private keys in a paper wallet, hardware manufacturers may provide back-up storage devices (e.g., USB flash drives). However, such hardware devices can also be lost, stolen, broken, and corrupted.

Some other conventional methods for securing and storing private keys may be to encrypt the private key using a personal passphrase. A thief will need both the encrypted private key and the user's passphrase to obtain the private key and gain control of the user's blockchain account. However, the user must always remember the passphrase and the passphrase must be long enough to be properly secure, which may also require the user to back-up or store the passphrase. The process of properly storing the encrypted private keys with strong passphrases may create numerous challenges for users. For example, the conventional methods may still require the users to protect the personal passphrase from theft, loss or damage. In an alternative way, the user may resort to a centralized security model to protect the personal passphrase. In a centralized security model, a central administrator may store the private keys or the encrypted private keys and personal passphrases. However, relying on a central administrator to handle this responsibility would eliminate the primary benefit of blockchain technology, which is to decentralize risk across the many participants in the network.

A proper private key storage and security system is critical for blockchain technology and its decentralized framework to properly function. Moreover, with mainstream adoption of blockchain technology outside of crypto currencies, a private key security and back-up system where users are not responsible for storage and safekeeping of their private keys is needed.

SUMMARY

For the aforementioned reasons, what is desired is a computer-based solution that properly secures a user's private key with an equally secure back-up system that does not require the end user to physically store the private key or its encrypted private key counterpart. What is further desired are systems and methods that do not require private key owners to remember or physically store a long passphrase that is strong enough to back-up the private key.

Embodiments described herein are systems and methods capable of addressing the aforementioned technical problems and may provide any number of additional or alternative benefits and advantages. An analytic server may have an application installed in the end user's client device. The application may require the user to create a series of personally crafted security questions to which only the user has the answers. The answers to the security questions may satisfy an entropic threshold. Based on the answers to the series of personally crafted security questions, an application running on the client device may generate a passphrase and encrypt the user's private key based on the passphrase. The application may transmit the encrypted private key to the analytic server. The private key may be inaccessible to the analytic server because of the encryption applied to the private key. The embodiments described herein may not require the user to remember or physically store the passphrase or the private key.

In one example of operation, when the user tries to access the private key of a blockchain or other applications, the analytic server may send the user personal security questions and the encrypted private key. The application running on the client device may display one security question at a time on a graphical user interface (GUI) of the user's electronic client device. The application may require the user to provide the answer to each security question. When the application receives the answers to all security questions, the application may use the resulting passphrase to decrypt the user's encrypted private key. Once the application decrypts the private key, the user may be able to use the re-established/restored private key to access the blockchain and other applications.

The private keys of blockchains are used as an illustrative example in this disclosure. The methods and systems described herein may be applicable to any other sensitive information of any applications that need to be protected.

In an embodiment, a computer-implemented method comprises establishing, by an application running on a client device, an entropic threshold based upon a request to protect one or more private keys; receiving, by the application running on the client device, a series of security questions and corresponding answers created by a user operating the client device, wherein each answer corresponds to an entropy score, a total entropy score of the received answers is a sum of the entropy score of each answer; generating, by the application running on the client device, a passphrase based on the received answers whose total entropy score satisfies the entropic threshold; encrypting, by the application running on the client device, the one or more private keys based on the passphrase; transmitting, by the application running on the client device, the series of security questions and the encrypted private keys to a server for storage into a database; transmitting, by the application running on the client device, a request to the server to access the one or more private keys; receiving, by the application running on the client device, the series of security questions and the encrypted private keys from the server; displaying, by the application running on the client device, each of the series of security questions on a graphical user interface of the client device; receiving, by the application running on the client device, an entered answer to each of the series of security questions from the client device; generating, by the application running on the client device, the passphrase based on the entered answers to the series of security questions; and decrypting, by the application running on the client device, the encrypted private keys based on the passphrase to obtain the one or more private keys.

In another embodiment, a computer system comprises a client device; a server in communication with the client device; wherein a processor of the client device executes an application configured to: establish an entropic threshold based upon a request to protect one or more private keys; receive an input of a series of security questions and corresponding answers created by a user, wherein each answer corresponds to an entropy score, a total entropy score of the received answers is a sum of the entropy score of each answer; generate a passphrase based on the received answers whose total entropy score satisfies the entropic threshold; encrypt the one or more private keys based on the passphrase; transmit the series of security questions and the encrypted private keys to the server for storage in a database; receive from the server the series of security questions and the encrypted private keys; upon accessing the one or more encrypted private keys, display each of the series of security questions on a graphical user interface of the client device; receive an entered answer to each of the series of security questions; generate the passphrase based on the entered answers to the series of security questions; and decrypt the encrypted private keys based on the passphrase to obtain the one or more private keys.

BRIEF DESCRIPTION OF THE DRAWINGS

The accompanying drawings constitute a part of this specification and illustrate an embodiment of the subject matter described herein.

FIG. 2 illustrates a flow diagram of an illustrative method for authentication using entropic threshold, according to an embodiment.

FIG. 11 illustrates a flow diagram of operations in a blockchain application, according to an embodiment.

FIG. 12 illustrates a flow diagram of operations in a crypto currency (e.g., bitcoin) application, according to an embodiment.

DETAILED DESCRIPTION

Figure 1:
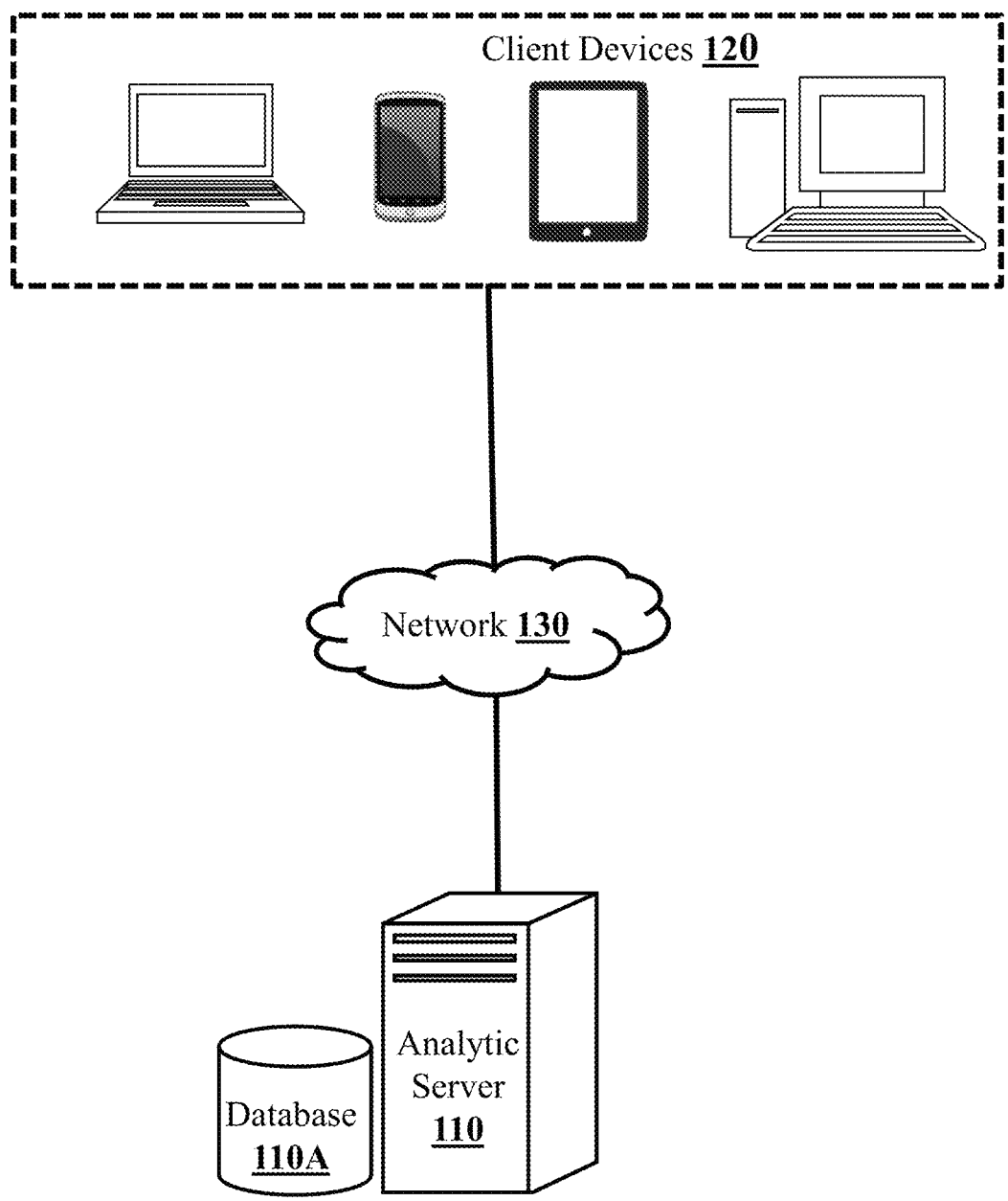
FIG. 1 illustrates components of a system for authentication using entropic threshold, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein describe systems and methods for providing protection of private keys without requiring the user to remember or physically store the private keys. Instead of requiring the user to store a very long string of letters and numbers, the embodiments described herein may require the user to answer a series of security questions and use the answers to generate a passphrase. Specifically, an analytic server may require the user to create a series of personally crafted security questions to which only the user has the answers via an application running on the client device. For example, a security question may ask the name (e.g., first name and surname) of a person described in the security question. The application may derive the passphrase based on a list of names that are answers to the security questions. The passphrase (e.g., list of names) may satisfy an entropic threshold. The application may encrypt the private key based on the passphrase. The analytic server may also store the encrypted private key and the series of security questions into a database or a blockchain. The analytic server or the client device may not store the user's answers to the security questions on any storage device.

Because the answers to the security questions are only known to the user who creates the security questions, the answers are uniquely binding the user to the security questions. When the user tries to access the private key, the user may provide the answers (e.g., first name and surname) to the security questions. The application may obtain the passphrase by combining the names. If the user enters all the names correctly, the application may be able to obtain the correct passphrase that was used to encrypt the private key. The application may decrypt the user's encrypted private key based on the passphrase. Because the answers reside in the user's long-term memory and are not stored in any physical storage device, the methods and systems described herein can protect the answers from the threat of theft, loss, damage, or corruption.

FIG. 1 illustrates components of a system 100 for authentication using entropic threshold, according to an embodiment. The system 100 may comprise an analytic server 110, a database 110A, and one or more electronic client devices 120, that are connected with each other via hardware and software components of one or more networks 130. Examples of the network 130 include, but are not limited to, Local Area Network (LAN), Wireless Local Area Network (WLAN), Metropolitan Area Network (MAN), Wide Area Network (WAN), and the Internet. The communication over the network 130 may be performed in accordance with various communication protocols, such as Transmission Control Protocol and Internet Protocol (TCP/IP), User Datagram Protocol (UDP), and IEEE communication protocols.

The analytic server 110 may be any computing device comprising a processor and other computing hardware and software components. The analytic server 110 may be logically and physically organized within the same or different devices or structures and may be distributed across any number of physical structures and locations (e.g., cabinets, rooms, buildings, cities).

The analytic server 110 may be a computing device comprising a processing unit. The processing unit may include a processor with computer-readable medium, such as a random access memory coupled to the processor. The analytic server 110 may be running algorithms or computer executable program instructions, which may be executed by a single processor or multiple processors in a distributed configuration. The analytic server 110 may be configured to interact with one or more software modules of a same or a different type operating within the system 100.

Non-limiting examples of the processor may include a microprocessor, an application specific integrated circuit, and a field programmable object array, among others. Non-limiting examples of the analytic server 110 may include a server computer, a workstation computer, a tablet device, and a mobile device (e.g., smartphone). Some embodiments may include multiple computing devices functioning as the analytic server 110. Some other embodiments may include a single computing device capable of performing the various tasks described herein.

During the initial account set-up, the analytic server 110 may require the user to create a unique "account locator" by answering three to five pre-defined account locator questions (e.g., city of birth, mother's maiden name). The analytic server 110 may require the user to submit the answers to the account locator questions until an account locator entropic threshold is satisfied. The application running on the client device 120 may receive the account locator answers, hash the answers, and stretch the hash to generate an account key. The account key may derive an account identifier and an account data key. Client device 120 may transmit the account identifier to the analytic server 110. The analytic server 110 may store the account identifier into the database 110A.

When the user tries to access the application at a later time, the analytic server 110 may require the user to answer the account locator questions. The application may use the answers to regenerate an account key, which derives the account identifier and the account data key. The client device 120 may transmit the regenerated account identifier to the analytic server 110. If the regenerated account identifier matches any account identifier stored in the database, the analytic server 110 may identify the user's account.

The client device 120 may be any computing device allowing a user to interact with the analytic server 110. The client device 120 may be any computing device comprising a processor and non-transitory machine-readable storage medium. The examples of the computing device may include, but are not limited to, a personal digital assistant (PDA), a smartphone, a tablet computer, and the like. The client device 120 may be a mobile device or handheld computer that provide a touchscreen interface with digital buttons and keyboard or physical buttons along with a physical keyboard. The client device 120 may comprise integrated cameras, digital media players, and the global positional system (GPS) capabilities. The client device 120 may comprise any number of input and output devices supporting various types of data, such as text, image, audio, video, and the like. The client device 120 may run mobile operating systems that allow third-party applications to be installed and run. For example, the client device 120 may install the authentication application on the client device 120 to communicate with the analytic server 110.

The analytic server 110 may provide protection of private keys for the user. The private keys are used as an illustrative example in this disclosure, the methods and systems described herein may be applicable to any other sensitive information to be protected. To provide protection of private keys, the analytic server 110 may request a user to create a series of security questions via the application running on the client device 120. The application may generate a passphrase based on the answers to the security questions. The application may encrypt the private keys based on the passphrase created by the user. In operation, the application may request the user to fill in the security questions in a graphical user interface (GUI) of the client device 120. In this embodiment, the GUI does not provide options for the security questions, rather the user composes a set of questions on their own and inputs those questions into the application. The GUI may also comprise a text field for the user to enter the answer to each security question. The application may combine the answers to obtain the passphrase. The application may transform the passphrase into an encryption key and use the encryption key to encrypt a private key. The application may transmit the encrypted private key to the analytic server 110. The analytic server 110 may store the encrypted private key into the database 110A. Importantly, the client device 120 and analytic server 110 may not store the user's answers to the security questions on any storage device.

Furthermore, the application may use the account data key to encrypt the security questions and transmit the encrypted security questions to the analytic server 110. In addition, the application may use the user account key and the answers to the security questions to generate a proof of knowledge (PoK) token and transmit the PoK token to the analytic server 110. The analytic server 110 may save the encrypted security questions and the PoK token into the database 110A.

The database 110A may be any non-transitory machine-readable media configured to store the user account identifier, the series of encrypted security questions, the proof of knowledge token, and the encrypted private keys. The database 110A may be part of the analytic server 110. The database 110A may be a separate component in communication with the analytic server 110. The database 110A may have a logical construct of data files, which may be stored in non-transitory machine-readable storage media, such as a hard disk or memory, controlled by software modules of a database program (e.g., SQL), and a database management system that executes the code modules (e.g., SQL scripts) for various data queries and management functions.

When the user operating the client device 120 requests to access the private key, the analytic server 110 may require the user to answer the account locator questions. The application may use the answers to regenerate an account key, which re-derives an account identifier and an account data key. The client device 120 may transmit the regenerated account identifier to the analytic server 110. If the regenerated account identifier matches any account identifier stored in the database, the analytic server 110 proceeds using the user data stored under that account.

Upon identifying the user's account, the analytic server 110 transmits the encrypted security questions to the user's client device 120. The application running on the user's client device 120 may receive the encrypted security questions and decrypt these questions using the re-derived account data key to obtain the series of security questions in plaintext. The application may display the series of security questions in a GUI of the client device 120 and request the user to submit answers to the security questions.

After receiving the user's answers to all the security questions, the application running on the client device 120 may regenerate a proof of knowledge token based on the account key and the answers. The application on the client device 120 transmits the regenerated token to the analytic server 110. The analytic server 110 may determine whether the regenerated proof of knowledge token matches the token stored in the database 110A. If there is a match, the analytic server 110 may transmit the encrypted private key to the user's client device 120.

After the application receives all the answers from the user, the application may obtain the passphrase by combining the answers. If the user enters all the answers correctly, the application may be able to obtain the correct passphrase that is used to encrypt the private key. The application may decrypt the user's encrypted private key based on the passphrase. After the application decrypts the encrypted private key, the user may be able to access the re-established private key.

FIG. 2 shows a flow diagram of an illustrative method 200 for authentication using entropic threshold, according to an embodiment. It should be understood the steps of the method 200 described below are merely illustrative and additional, alternative, and lesser number of steps are to be considered within the scope of this disclosure.

The method 200 may begin at step 202, where the application establishes a security question entropic threshold based upon a request to protect one or more private keys. The security question entropic threshold may correspond to the security level of the use case associated with the request (e.g., the sensitivity of the private key to be protected). A higher security level may have a higher entropic threshold. For example, for crypto currency blockchains, the entropic threshold may be up to 256 bits of entropy, which may match the security level of the private key itself. For other blockchains that are less sensitive, the entropic threshold may be smaller (e.g., 70 bits of entropy), which is enough security to prevent a brute force attack but not as defensible as the 128 to 256 bit security level used by most crypto currency systems.

Initially, the analytic server may require the user to register through the application and set up an account. The application may be a web application (e.g., comprising a hyperlink of a website) and/or a mobile application downloaded and installed in the electronic client device associated with the user. The client device may transmit the request to protect one or more private keys to the analytic server via the application.

During the initial account set-up, the analytic server may require the user to create a unique "account locator" by answering three to five pre-defined account locator questions (e.g., city of birth, mother's maiden name). The analytic server may require the user to submit the answers to the account locator questions until an account locator entropic threshold is satisfied. The account locator entropic threshold may be based on the particular use of the application. The application running on the client device receives the account locator answers, hashes the answers, and stretches the hash to generate an account key. The account key may derive an account identifier and an account data key (e.g., the application may generate the account identifier and the account data key based on the account key). The application may transmit the account identifier to the analytic server. The analytic server may store the account identifier into the database.

The purpose of the account locator questions may be to link the request with the appropriate user's account identifier. The account locator questions may need to meet the following conditions. First, the answers to the locator questions may not contain any information about the user that could be used by an attacker with access to the analytic server to help answer the user's security questions (described in the following step 204) that are used to protect the user's private key. Second, the user's locator questions may need to have a low potential harm level if the user's personal identifiable information (PII) were inappropriately accessed, used, or disclosed as per the NIST's (national institute of standards and technology's) confidentiality impact level guidance. Third, the user's locator questions may need to be unique enough to prevent random collisions between users, which means no two users can share identical answers to all of their locator questions.

The following list of account locator questions may satisfy all of the three conditions: mother's maiden name, father's middle name, mother's middle name, city of birth, graduating high school, and last 4 digits of social security number. The answers to these questions may not provide useful information about a user's identity that could potentially be used by an attacker to gain access to a user's security questions by breaking into the analytic server. The potential harm to a user may still be low if the user's information is inappropriately accessed during an attack. This is because the answers to these questions may not improve the attacker's chances of answering the user's security questions and cracking the user's private key. The answers on average may generate at least 48 bits of entropy which provide an acceptably low user collision rate. In the case where a user inputs the same answers used by a previous user, the analytic server may require the user to answer one or more additional locator question. Furthermore, the information in these locator questions are relatively inaccessible to the hacking community.

When the user tries to access the application at a later time, the analytic server may require the user to answer the account locator questions via the application. The application running on the client device uses the answers to regenerate an account key, which derives the account identifier and the account data key. The client device may transmit the regenerated account identifier to the analytic server. If the regenerated account identifier matches an account identifier stored in the database, the analytic server identifies the user's account.

In a next step 204, the analytic server may request a user to create a series of security questions via the application. To provide protection of private keys and/or other sensitive information, the embodiments disclosed herein may encrypt the private keys and/or other sensitive information using an encryption key. The application may generate the encryption key based on answers to the series of security questions and encrypt the private keys with the encryption key.

In some embodiments, the analytic server may first request the application to generate the private key for the user. The application may display a blank canvas on the client device where the user can draw random shapes. The application may generate a cryptographic strength private key based on the random shapes. The generation of private keys based on random shapes is just an illustrative example, other methods of generating private keys should also be considered to be in the scope of this disclosure.

The analytic server may request the user to create the security questions. For example, a security question may be "who was my classical guitar teacher?" The security questions created by the user may be questions to which only the user knows the answer. In some embodiments, the configuration of the security questions may be based on the use case associated with the user's private key. For example, for bitcoin private keys, the security level may be high. The user may need to carefully construct and well think out the security questions in advance. In such cases, the analytic server may strictly prohibit using names of people who are currently known to the user's family members, current friends, loved ones, associates or famous people. The fewer people who know the answers to a user's security questions, the more secure the user's private key is. In the use case where a user is securing financial data that are less sensitive, the security level may be lower. The requirements for the security questions may be more lax and may allow the user to include names of loved ones or family members.

In some configuration, the analytic server may use a set of rules to protect the user from entering false names. Specifically, the rules may prevent the user from using the same surname twice, using the user's own surname, using names of pets or cities, using names with only one letter or the same letter for multiple times (e.g., AAA), entering different names as the analytic server requires the user to type the name twice to prevent typos, inserting the surname of an actual person in the security question, spelling names without case sensitivity, and using a single first name where synonymous first name exists. For example, Bob could be used for Bobbie or Bobby irrespective of which naming convention the user picks. Furthermore, the analytic server may recommend the user to not use only family members for security reasons. When less people know the answers to the security questions, the passphrase generated from the answers is more secure.

In some embodiments, the analytic server may allow the user to create the series of security questions by using images of people. For example, the analytic server may allow the user to choose images from a photo library, such as images of friends, associates, and family members, to create the security questions. Alternatively, the analytic server may allow the user to use both the images and the text sentences to create the security questions.

After the user inputs a security question in the form of either text sentence or image, the application may request the user to provide the answer to the security question. The answer to each security question may be the name of the person described in the sentence or in the image.

The embodiments disclosed herein may provide users with tools necessary to create a self-deterministic and self-governing private key back-up security system. The strength of a user's security system may be directly tied to the uniqueness and obscurity of the user's personal security questions.

In a next step 206, the user's client device may receive security questions from the analytic server and the corresponding answers from the user inputs and determine a total entropy score for the received answers. Each name may have its own distinct and measurable entropy level. For example, a common name may have relatively low entropy score. On average, each surname may have 12.7 bits of entropy and each first name may have 7.0 bits of entropy. In operation, the application determines the entropy score for each name inputted by the user and the current total entropy score for the entered answers (e.g., names). The application may iteratively determine whether the current total entropy score satisfies a security question entropic threshold (established in step 202). If the current total entropy score does not satisfy the entropic threshold, the application may require the user to input additional security questions and answers until the entropic threshold is reached.

Although the example used in this disclosure relates to the use of first names and/or surnames of people, it is intended that other answers may be used, such as a pet, a place, a painting, an event, a plant, or other object or service. The use of other user-defined answers allows a much greater number of classes of answers, thereby increasing the number of possible answers for each question.

As discussed above in step 202, the application may generate an account key based on the user's answers to the account locator questions in the registration process. The account key may be used to derive an account identifier and an account data key. The application may use the account data key to encrypt the security questions in this step and transmit the encrypted security questions to the analytic server. The analytic server may store the encrypted security questions into the database. Furthermore, the application may use the user account key and the answers to the security questions to generate a proof of knowledge (PoK) token and transmit the token to the analytic server. The analytic server may save the token into the database.

The application may calculate an entropy score for each name based on statistical data. Specifically, the application may calculate the entropy score for a particular name by taking the log of the probability that the particular name is randomly chosen by a user. For example, according to statistical data, there are 2.4 million people in the United States with the name of "Smith." Since there are 290 million people in the dataset of the whole population, the probability that a user chooses "Smith" as an answer to one of the security questions is 0.83% (e.g., 2.4 M/290 M). The log 2 of 0.83% is 6.9, which is the entropy score for the particular name "Smith."

In some configurations, the application may calculate the entropy score by taking racial biases into consideration. The application may assume that users may have a tendency to choose names from the same race. The application may break the statistical data into four categories based on races:

White, Black, Asian, and Hispanic. Each race may have its own distinct entropy. For example, the entropy score for the Asian name "Nguyen" is 9.40 if this particular name is chosen randomly from the entire dataset. However, if the user chooses only Asian name for his/her security questions, the entropy for "Nguyen" may be a much lower value of 5.10. To compensate for racial biases and potentially lower entropy scores, the application may choose the lowest entropy score of each name from each race as a default value. In other words, the application may use the lowest entropy score for a name when calculating the total entropy score irrespective of whether the user is actually from the race that has the lowest entropy score. The application may not consider the user's race when calculating the total entropy score. The application may default to the lowest entropy score among all races and use that lowest entropy score for the total entropy score.

When a user inputs a name, the application may calculate its corresponding entropy score and add the entropy score to the previous total entropy score of the previously received answers to obtain the current total entropy score. If the current total entropy score satisfies the pre-selected entropic threshold, the application may determine that the creation of the security questions is finished. In operation, when the current total entropy score satisfies the pre-selected entropic threshold, the application may render an interactive component (e.g., a button) on the GUI of the user's client device. For example, the application may render a "submit" button that allows the user to complete the creation of the security questions and submit the security questions. Since the names may provide a total entropy level that exceeds the total entropy level of a conventional seed phrase protocol (e.g., bitcoin mnemonic seed phrase protocol), the application may use the names to generate passphrase and protect the private keys.

In a next step 208, the application may generate a passphrase from the answers to the security questions and encrypt the private key based on the passphrase. In some embodiments, the application may transform the passphrase into an encryption key and use the encryption key to encrypt the private key.

The application may sequentially combine the answers to the series of security questions to obtain the passphrase. The application may generate an encryption key (e.g., a master key) by applying a password key stretching algorithm (e.g., PBKDF2 with HMAC-SHA256) to the passphrase. Specifically, the application may apply the key stretching algorithm to the passphrase, a salt, and an iteration count to produce a 256-bit encryption key. For example, PBKDF2 may use a cryptographic hash, such as SHA-2, a longer salt (e.g. 64 bits) and a high iteration count (e.g., 1,000,000 rounds of hashing). Thus, PBKDF2 may effectively add roughly 20 bits of additional entropy to the entropy derived from the passphrase (e.g., the combination of names).

The encryption key derived from the passphrase may be an AES (advanced encryption standard) symmetric key. The application may use the encryption key to encrypt the user's private keys (and/or any other sensitive information). As a result, the embodiments disclosed herein may allow the user to change the security questions while keeping the same private key by re-encrypting the same private key with the new AES symmetric key derived from answers to the new security questions. The embodiments disclosed herein may provide the users the flexibility to change their security questions whenever they deem it necessary without having to recreate a new private key. Furthermore, the embodiments disclosed herein may provide protection of private keys by adding a layer of encryption to the private key. For example, because the private key is encrypted using the encryption key, an attacker may have the added challenge of having to hack into a host server to obtain the encrypted private key and crack the encryption key. Only after the attacker cracks the encryption key, the attacker can decrypt the encrypted private key and obtain the plaintext private key. However, because the application generates the encryption key based on the answers only known to the user, the encryption key is strong enough with an entropy score satisfying an entropic threshold and cannot be cracked or brute forced by the attacker.

The client device may transmit the encrypted private key to the analytic server. The analytic server may also store the encrypted private key and the series of encrypted security questions into a database as a back-up retrieval system. Importantly, the analytic server or the client device may not store the user's answers to the security questions. The user's answers may not be stored on any storage device. The analytic server may also advise the user to not write down any of the name answers nor take a photo of them.

Because the answers to the security questions are only known to the user who creates the security questions, the answers are uniquely binding each user to the security questions. Because the encryption key is strong enough with an entropy score satisfying an entropic threshold, and the private key is encrypted using such a strong encryption key, the methods and systems described herein can provide security against the threat of brute force attack. Furthermore, because the answers are not stored in any physical storage device, the methods and systems described herein can protect the answers from the threat of theft, loss, damage, or corruption.

In a next step 210, the analytic server may receive a request to access the private key from the user. For example, the user may return by accessing their mobile or web application and issue a request to access the private key via the application. To allow the user to access the private key, the analytic server may require the user to access the application and answer the account locator questions. The application uses the answers to regenerate an account key, which re-derives an account identifier and an account data key. The application may transmit the regenerated account identifier to the analytic server. If the regenerated account identifier matches any account identifier stored in the database, the analytic server identifies the user's account.

In a next step 212, the analytic server may transmit the security questions created by the user to the client device. Upon authenticating the user's identifier, the analytic server may retrieve the security questions corresponding to the user's identifier from the database. As discussed above, the security questions are encrypted using the account data key. The analytic server may transmit the encrypted security questions to the user's client device. The application running on the user's device receives the encrypted security questions and decrypts the questions using the re-derived account data key to obtain the series of security questions in plaintext. By decrypting the security questions in the application running on the client device, the analytic server may no longer need to see the answers to the account locator questions. As a result, the users may remain virtually anonymous (a nearly zero knowledge system) if their account locator answers have enough entropy. The analytic server may only see a random-looking account identifier. The other information the analytic server can see may be encrypted and only be decrypted on the user's client device.

The application may display the series of security questions on a GUI of the user's client device. Each of the series of security questions may be a text sentence or an image based on the user's customization. The application may display one security question at a time on the GUI of the user's electronic client device. The application may require the user to input the name corresponding to the answer to each security question. For example, the application may render a graphical interactive element (e.g., a text box, a text field, or a text entry box) to allow the user to input the answer (e.g., name) to each security question.

After receiving the user's answers to all the security questions, the application running on the client device may regenerate a proof of knowledge token based on the account key and the answers. The application on the client device may transmit the regenerated token to the analytic server. The analytic server may determine whether the regenerated proof of knowledge token matches the token stored in the database. If there is a match, the analytic server may proceed to transmit the encrypted private key to the user's client device.

The proof of knowledge (PoK) token may be required to obtain the encrypted private key to prevent external attacks. For example, the mobile or desktop application may need to prove to the analytic server that it knows the right security answers before it is allowed to see the encrypted private key. This may create an added layer of security to protect users who chose bad security questions. For example, if the user's security questions are weak enough to be brute forced, the PoK token requirement may force the attacker to contact the analytic server each time an attempt is make at cracking the user's private key. This may make an attacker's workload and cost associated with an outside attack on the user's device nearly impossible to achieve because it prevents the attacker from using a supercomputer to crack the user's security questions. Additionally, the mobile or desktop application may implement an IP (Internet protocol) address rate limiter for failed login attempts, which together with the PoK token scheme may prevent brute force or DDoS (distributed denial-of-service) attacks at the application layer of the mobile or desktop device.

In a next step 214, the application may decrypt the user's encrypted private key based on the answers to the security questions via the application on the client device. After the user's client device receives all the answers, the user's device may obtain the passphrase by combining the names. If the user enters all the names correctly, the user's device may be able to obtain the correct passphrase that is used to decrypt the private key. The application may decrypt the user's encrypted private key based on the passphrase on the user's client device. In operation, the application may generate the encryption key using the same key stretching algorithm in step 208 based on the passphrase. The application may use the encryption key to decrypt the encrypted private key. After the application decrypts the encrypted private key, the user may be able to use the re-established/restored private key to access the blockchain or other applications.

The embodiments disclosed herein may be able to restore the user's private key whenever the user accesses the application even when the user loses his/her client device or gets a new one. Even if a user loses his/her mobile or desktop device without a backup, the user will not lose access to his/her private keys. The user may be able to restore his/her private key by downloading a new application and answering the account locator questions and the security questions. The embodiments disclosed herein may provide a private key restoration system that does not require remembering a passphrase or having to physically safeguard and store a back-up passphrase.

Because only the encrypted private key is stored, the embodiments disclosed herein may provide security protection from brute force attacks. To decrypt the encrypted private key, an attacker must brute force all the security answers simultaneously in order to produce the passphrase used to generate the encryption key. Because the encryption key is strong enough with an entropy score satisfying an entropic threshold, the encryption key is computationally secure against the brute force attack.

Embodiments disclosed herein may prevent inside attacks. Specifically, for crypto currency private keys, the analytic server may require the user to choose locator questions and answers that create a minimum of 72 bits of entropy, which may require the current fastest super computers roughly five years on average to solve the locator questions. However, after successfully solving a user's locator questions, the attacker may face a much more significant challenge in having to solve the user's security questions. The attacker may need to solve, separately, each user's set of security questions due to the salt added to the user's passphrase. For crypto currency private keys where the minimum entropic threshold may be set at 100 bits (e.g., 6 security questions comprising 12 first and surnames), the attacker's success rate may be only one correct passphrase out of every trillion users. The attacker may first need to target a small enough entropy level that makes the attack seem achievable and because the key stretching algorithm adds roughly 20 bits of entropy to the encryption key, the attacker may need to choose the top 16 most common names to start the attack. Each name in the top 16 names may have an entropy of 4 bits, so 12 names may have 48 bits of entropy plus the 20 bits from key stretching. In this example, the attacker may face 68 bits of effective entropy, which may require years of effort with a supercomputer to crack a single user's security questions. However, it may be expected that only 1 in a trillion users may input all 12 names in the top 16 most common names used for the security questions. In other words, there is no attack surface large enough with correspondingly low enough entropy that could realistically produce any solvable results no matter what names the user chose so long as the user chose 12 different names. Therefore, the hacking reward is small assuming the attacker needs $200,000 to set up enough super computers to make individual attempts at cracking the user's security questions and 200 computers simultaneously working to solve 200 users' security questions. The cost associated with successfully hacking each user's security questions may be too large and may substantially exceed any potential reward. Thus, the attacker may have no reason or motivation to hack the system described herein.

In some embodiments, the system and method described herein may use a threshold public key cryptography or multi-party computation (MPC) as an alternative to using a centralized analytic server to store users' account identifier, encrypted security questions, and the proof of knowledge token. In this configuration, the embodiments disclosed herein may utilize the nodes in a blockchain network to decentralize the storage of the users' identifying information, the back-up information and the private keys. Threshold cryptography may protect information by encrypting and distributing the information across a fault-tolerant network of computers. With threshold cryptography, a threshold may be set at some pre-determined level (e.g., 60%), which may require at least 60% of the nodes in the network to participate in a user's attempt to retrieve their private key. In some embodiments using MPC, the user's encrypted private key may be broken into encrypted shards and distributed across different nodes in the network. Some minimum percentage of the network's nodes may be required to participate in a multi-party computation in order for a user to attempt to decrypt their private key. In such cases, it may be impossible for an attacker to crack a user's private key without the assistance of some number of the nodes in the network. The multi-party computation may allow two or more computers to calculate a formula while each party only knows some of the inputs. All parties together may know all of the inputs to the formula, but individually, none knows all the inputs needed to solve the formula. Therefore, no single node can calculate the answers to security questions used to protect the private key, but a sufficient percentage of the nodes acting together can. In this decentralized and distributed configuration, brute force attacks may become impossible to achieve unless an attacker receives or forces the cooperation of a sufficient number of nodes.

The embodiments disclosed herein may achieve anonymity for all account users. The embodiments disclosed herein may have no centralized points of attack. The embodiments disclosed herein may create a private key and back-up which do not need to be written down, stored or safe guarded.

Figure 3:
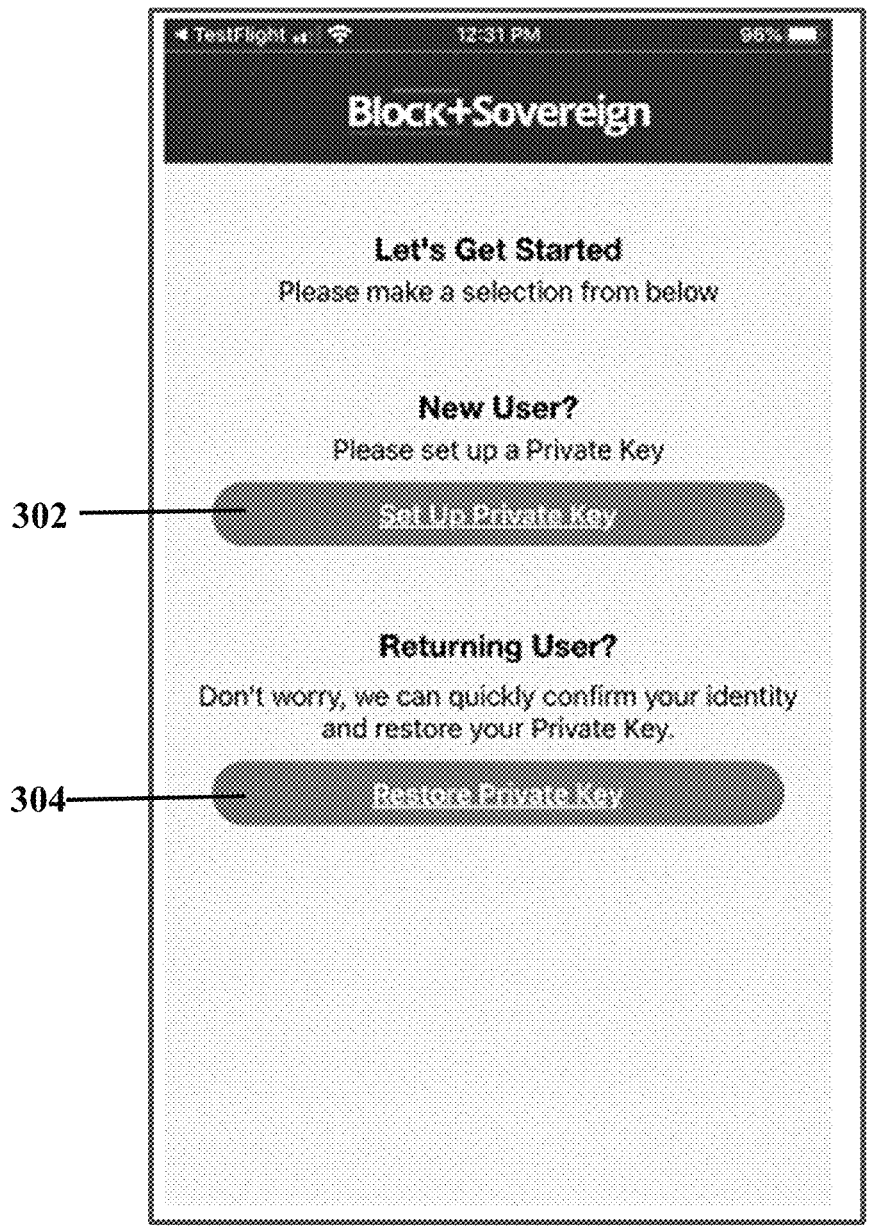
FIG. 3 illustrates a graphical user interface for enabling creation of a private key, according to an embodiment.

FIG. 3 illustrates a graphical user interface 300 for enabling the creation of a private key, according to an embodiment. After a new user accesses the mobile application or web application installed in the user's client device, the analytic server may enable the user to create and back up one or more private keys via the application. For example, the application may display an interactive component 302, such as a button that allows the user to set up a private key. Upon the user interacting with the interactive component (e.g., button) 302, the application may redirect the user to a new graphical user interface to instruct the user to create the private key. For a returning user that has already set up a private key, the graphical user interface may comprise another interactive component (e.g., button) 304 that allows the returning user to restore the private key.

Figure 4A:
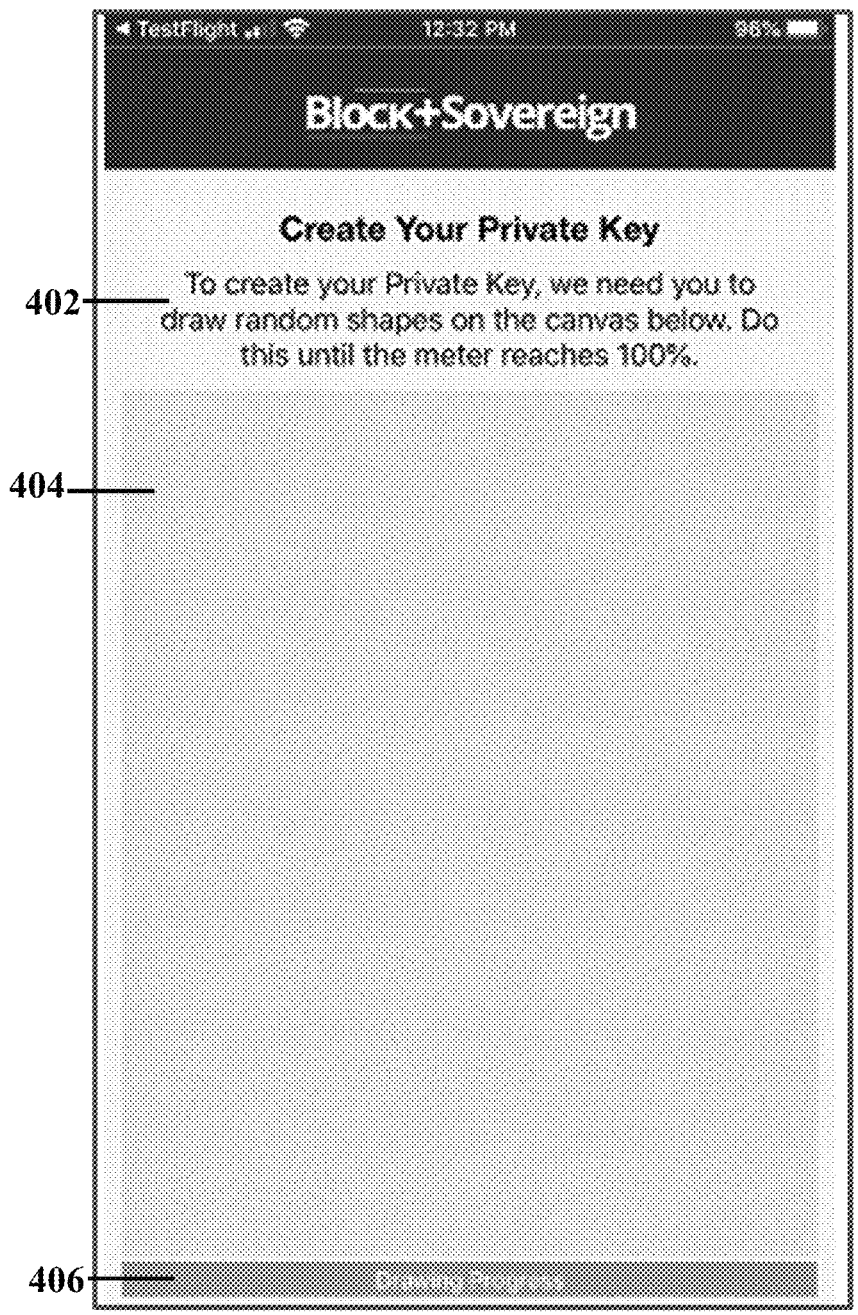
FIGS. 4A-4B illustrate graphical user interfaces for instructing the creation of a private key, according to an embodiment.
Figure 4B:
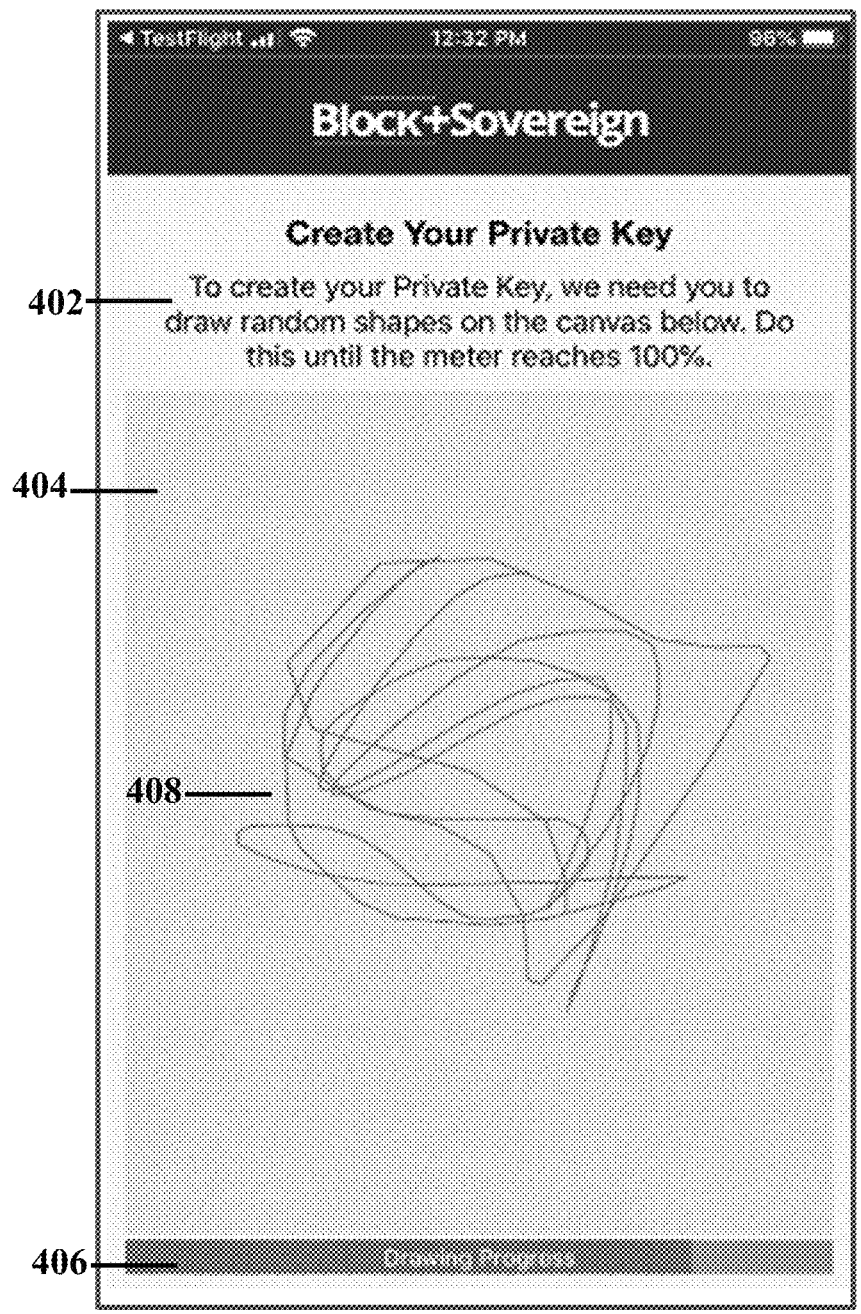

FIGS. 4A-4B illustrate graphical user interfaces 400A, 400B for instructing the creation of a private key, according to an embodiment. The GUI 400A may comprise the instruction 402 to instruct the user to draw random shapes on a canvas 404 included in the GUI. The GUI 400A may also include the canvas 404. The user may be able to draw random shapes within the canvas 404. The application may use a meter 406 to measure the completion level of the drawing in real time. The application may require the user to draw random shapes until the meter 406 reaches 100% of completion. The GUI 400B may comprise the random shape 408 drawn by the user in the canvas 404.

The application may receive the user's random shapes and generate a private key based on the random shapes. The generation of private keys based on random shapes is just an illustrative example, other methods of generating private keys should also be considered to be in the scope of this disclosure.

Figure 5A:
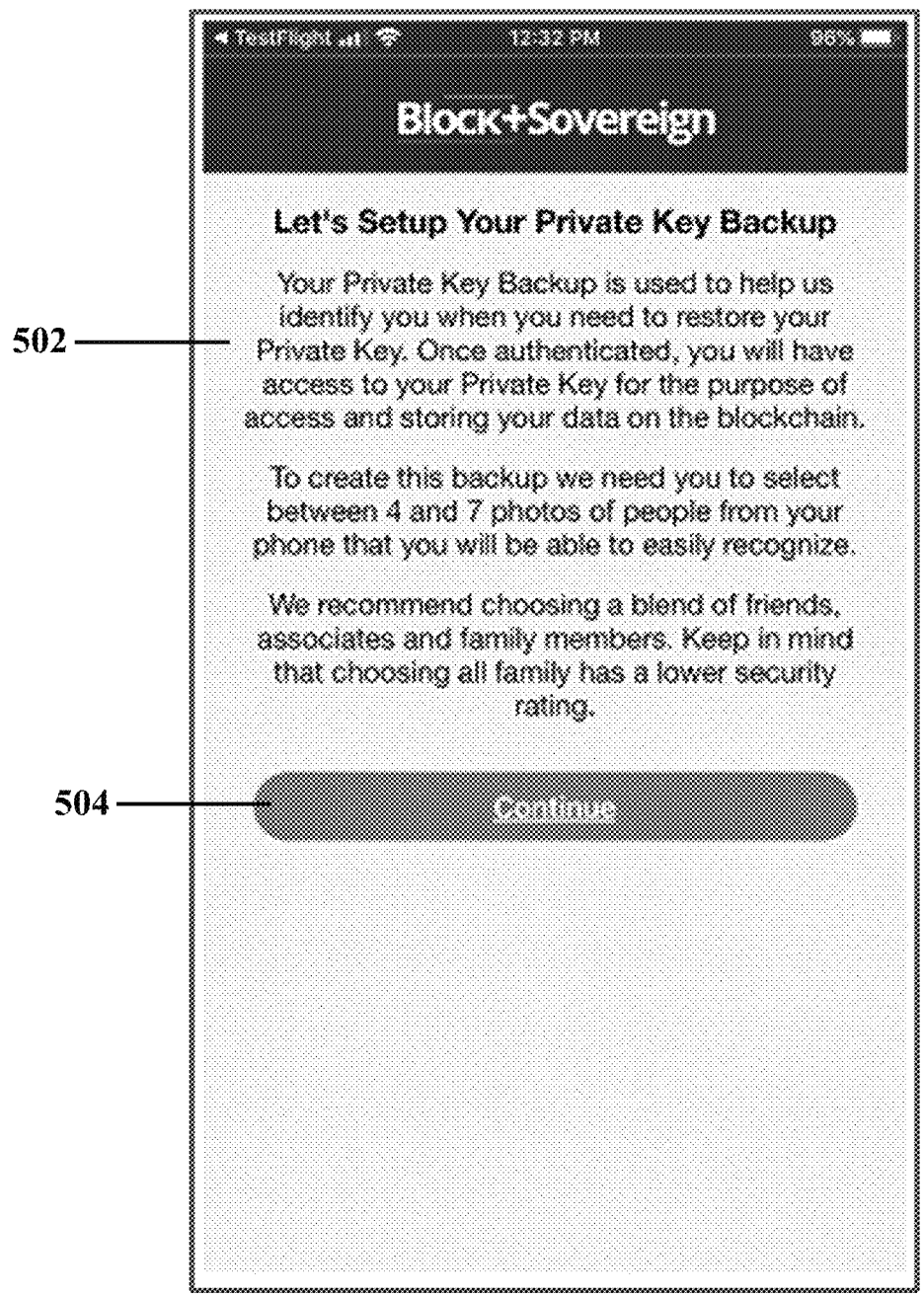
FIGS. 5A-5B illustrate graphical user interfaces for creating a series of security questions, according to an embodiment.
Figure 5B:
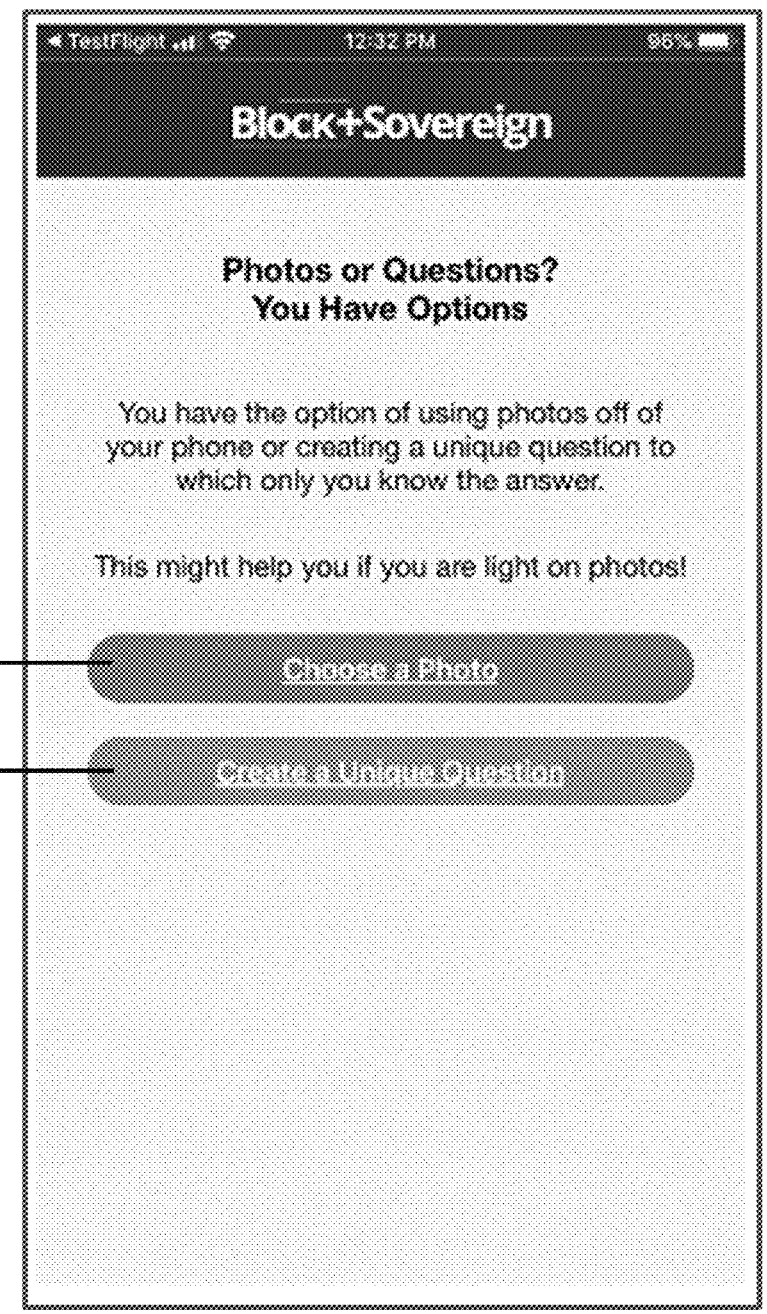

FIGS. 5A-5B illustrate graphical user interfaces 500A, 500B for creating the series of security questions, according to an embodiment. The application may require the user to create a passphrase (e.g., personal security code) by creating a series of security questions and providing the answer to each security question. The GUI 500A may comprise instructions 502 on how to create the security questions. In this example, the application may require the user to create the security questions by choosing photos of people the user can recognize when accessing the application in the future. The GUI 500A may also comprise an interactive component (e.g., a button) 504 that enables the user to create the security questions. The GUI 500B may comprise interactive components (e.g., buttons) that enable the user to create the series of security question by uploading photos 512 and/or inputting text format questions 514.

Figure 6A:
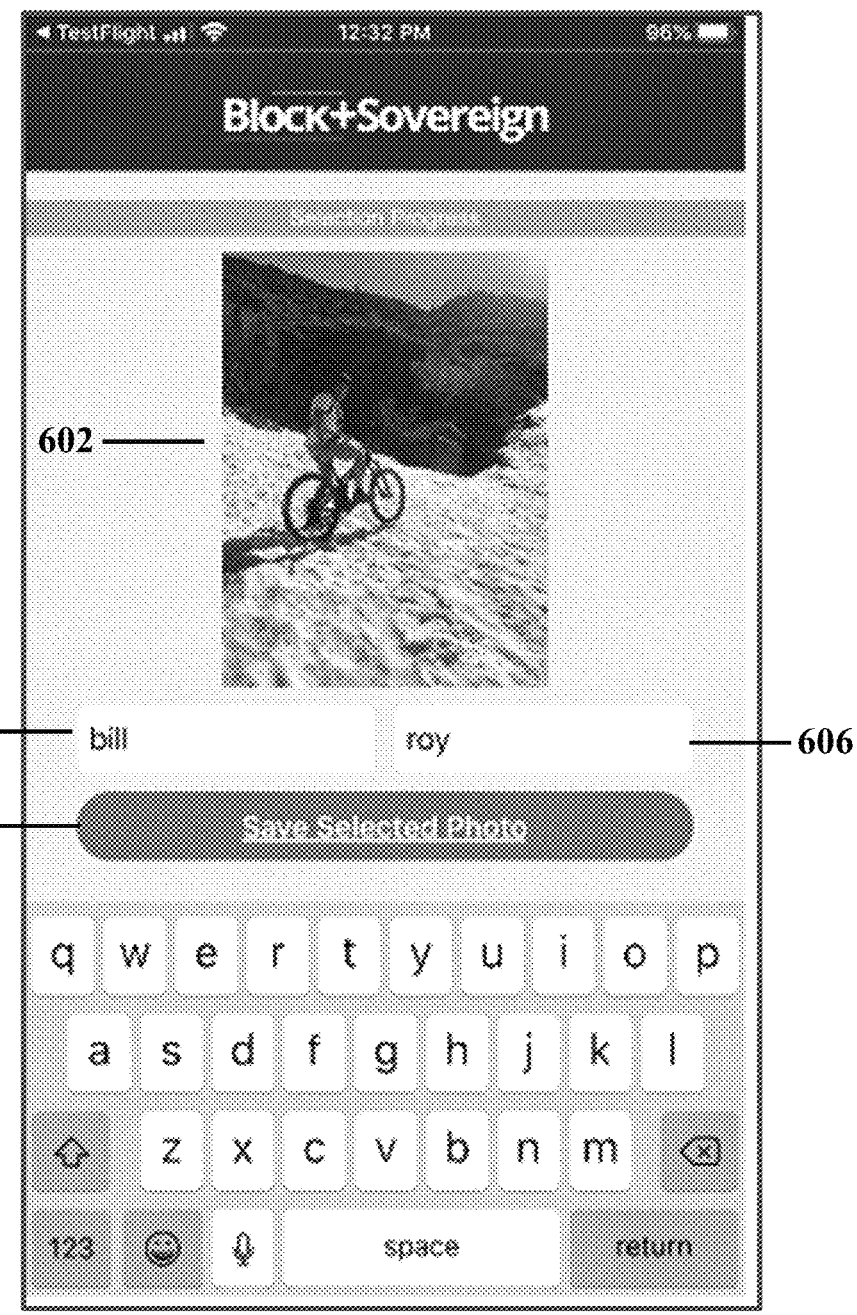
FIGS. 6A-6B illustrate graphical user interfaces for entering an answer to a security question, according to an embodiment.
Figure 6B:
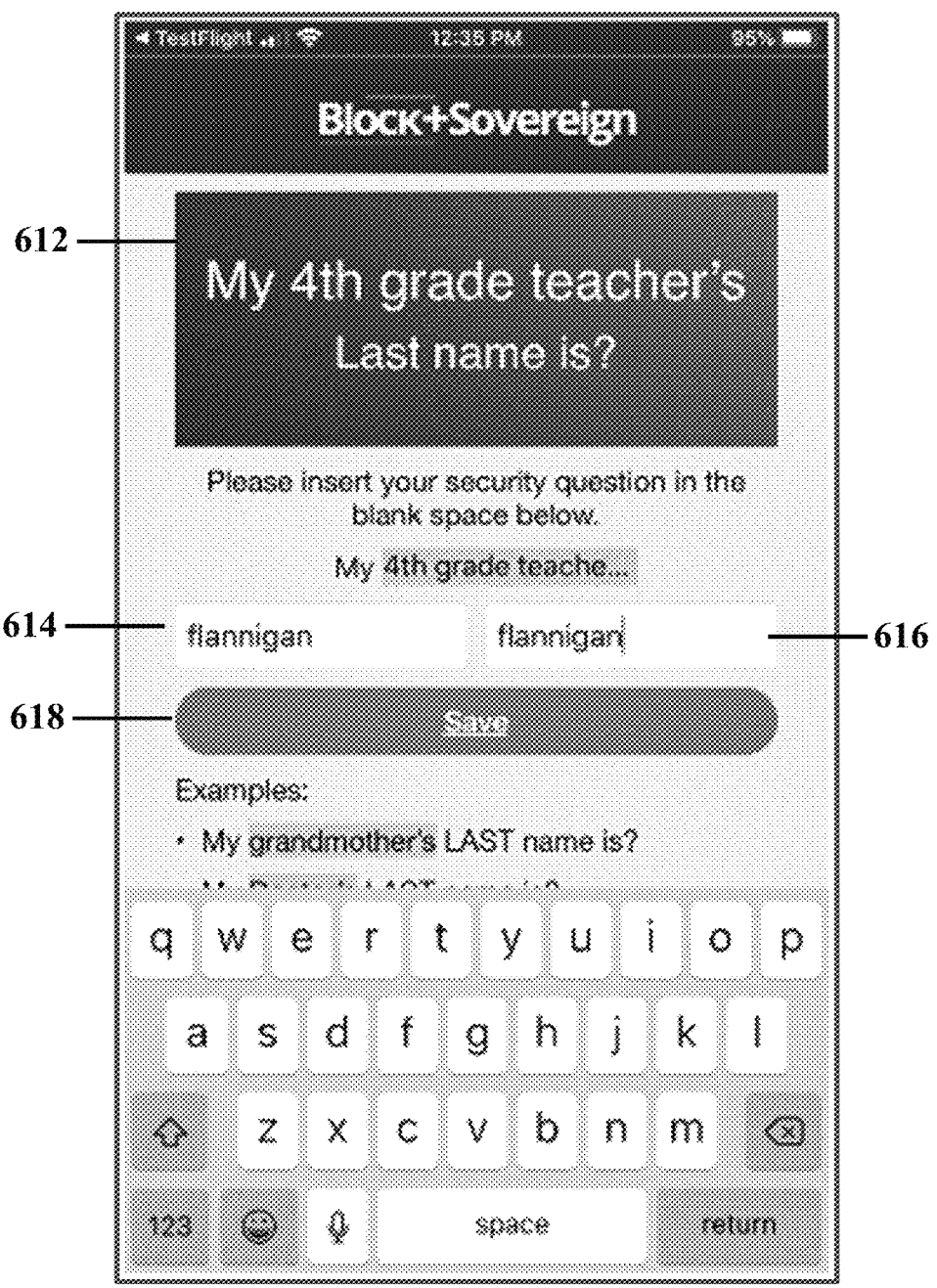

FIGS. 6A-6B illustrate graphical user interfaces 600A, 600B for entering an answer to a security question, according to an embodiment. The GUI 600A may correspond to creating a security question based on uploading a photo. After the user uploads a photo for one of the security questions, the application may request the user to provide the answer to the security question. The GUI 600A may comprise the uploaded photo 602, a text-based interface 604 for inputting the first name of the person in the photo, another text-based interface 606 for inputting the surname of the person in the photo. The first name and/or the surname may be the answer to the security question. The GUI 600A may also comprise a button 608 to save the selected photo.

The GUI 600B may correspond to creating a security question based on inputting a text format question. The GUI 600B may comprise a text-based interface 612 for the user to type/input the security question. The GUI 600B may also comprise the text-based interfaces 614, 616 for the user to input the answer to the security question and a button 618 to save the security question.

As the user enters each name, the application may determine the entropy score for each name and the current total entropy score for the entered names of the created security questions. The application may iteratively determine whether the current total entropy score satisfies the user's pre-selected entropic threshold. The application may display a progress bar (not shown) to show the progression of the current total entropy score relative to the pre-selected entropic threshold.

Figure 7:
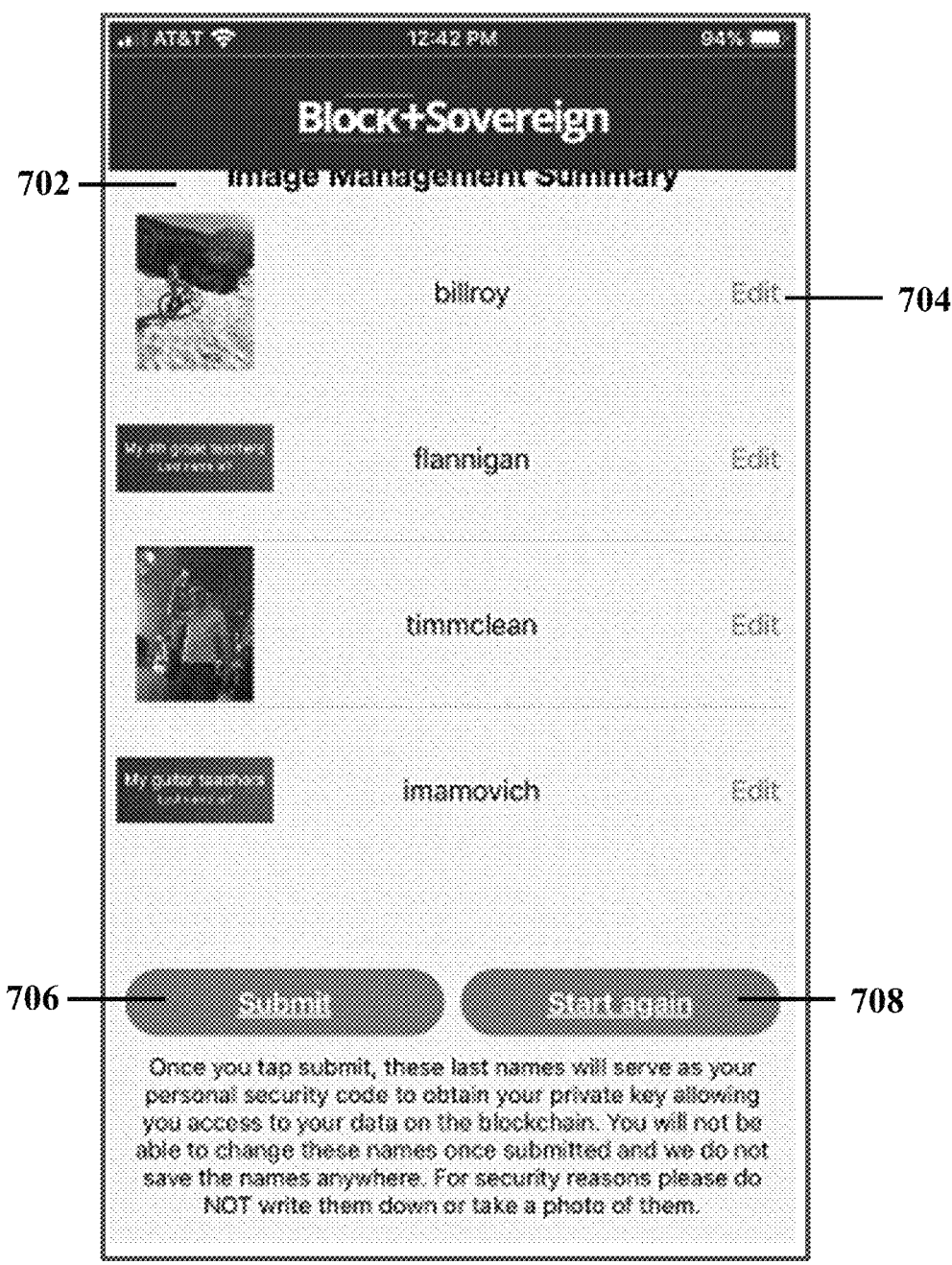
FIG. 7 illustrates a graphical user interface for completing the creation of the series of security questions, according to an embodiment.

FIG. 7 illustrates a graphical user interface 700 for completing the creation of the series of security questions, according to an embodiment. After the user creates the series of security questions with the total entropy score satisfying the entropic threshold, the application may allow the user to submit the security questions and corresponding answers and complete the creation of the security questions. The GUI 700 may comprise the summary 702 of the created security questions and the answers for the user to review. In this example, some of the security questions are in the form of images and some of the security questions are in the form of text. The answers are the names of people in the images or the text format questions. The user may edit each security question and answer by interacting with an "edit" button 704. The GUI 700 may also comprise a "submit" button 706 to allow the user to submit the security questions and corresponding answers. The GUI 700 may further comprise a "start again" button 708 to allow the user to reset the security questions from beginning.

Figure 8:
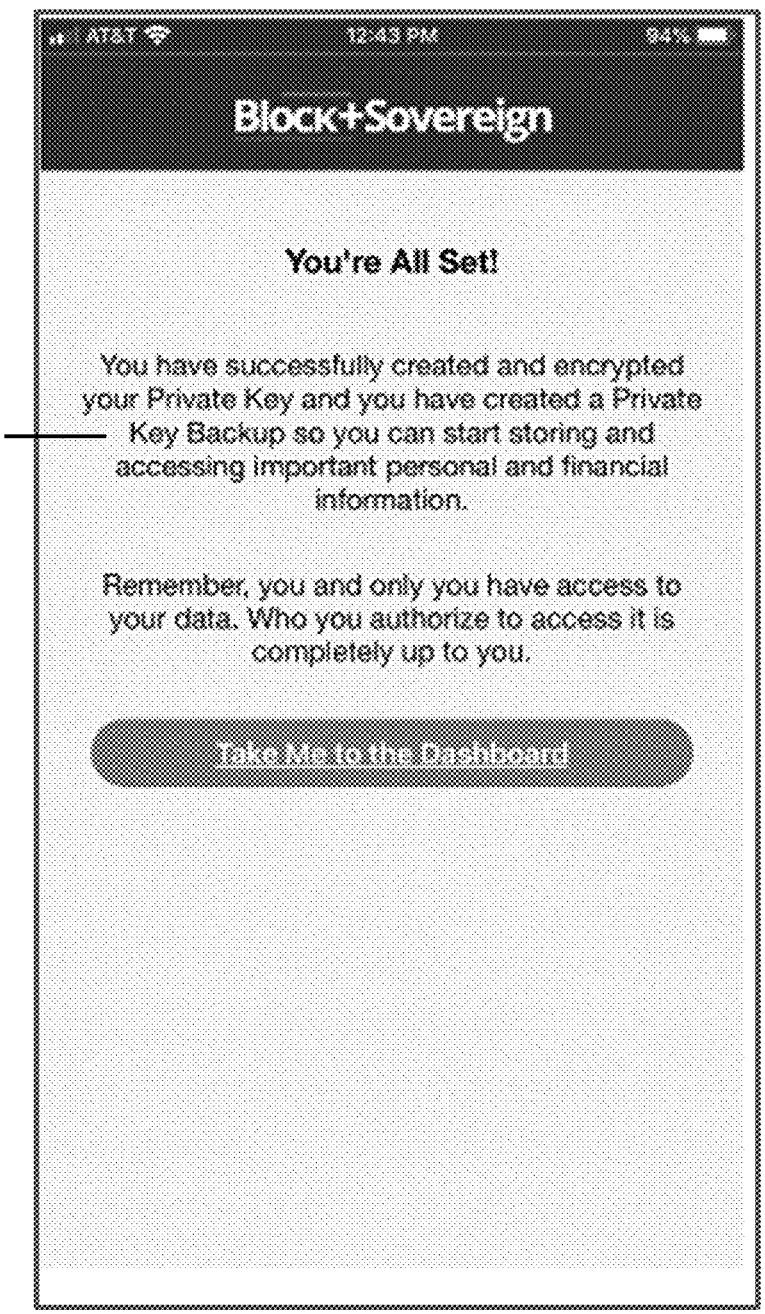
FIG. 8 illustrates a graphical user interface for confirming success of encrypting the private key, according to an embodiment.

FIG. 8 illustrates a graphical user interface 800 for confirming success of encrypting the private key, according to an embodiment. The application may generate an encryption key based on the answers to the series of the security questions and further encrypt the private key using the encryption key to protect the private key. The GUI 800 may show the confirmation of the success 802 of encrypting the private key.

Figure 9:
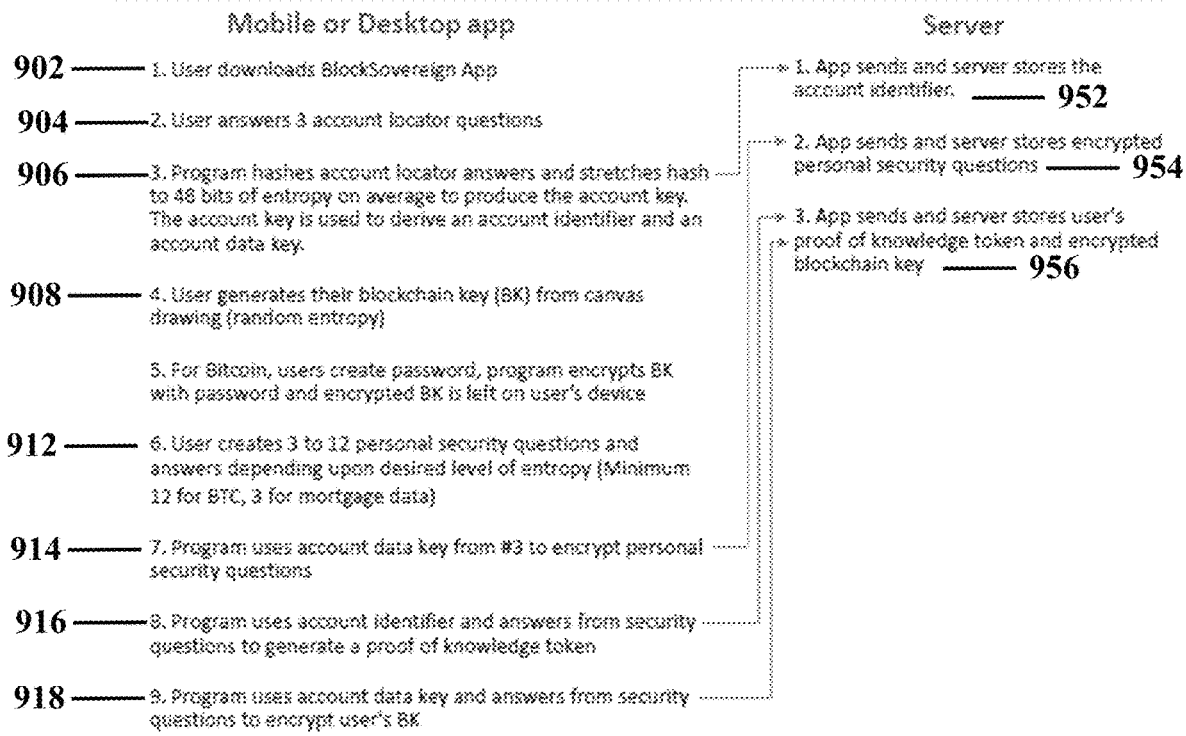
FIG. 9 illustrates a flow diagram of operations on a client device and a server during account set-up, according to an embodiment.

FIG. 9 illustrates a flow diagram 900 of operations on the client device and the server during account set-up, according to an embodiment. The user associated with the client device may download and install the authentication application 902 to communicate with the server. The user may answer the account locator questions 904 via the application. The application running on the client device may hash the account locator answers and stretch that hash to generate the account key, which may be used to derive an account identifier and an account data key 906. The application running may send the account identifier to the server (e.g., analytic server), and the server may store the account identifier into the database 952. The user may generate the private key (e.g., blockchain key) from canvas drawing 908. The user may create a series of personal security questions and provide answers until the security question entropic threshold is satisfied 912. The application may use the account data key to encrypt the series of security questions 914. The application may send the encrypted security questions to the server, and the server may store the encrypted security questions into the database 954. Furthermore, the application may use the account key and answers to the security questions to generate a proof of knowledge token 916. The application may send the proof of knowledge token to the server, and the server may store the proof of knowledge token into the database 956. The application may use the answers to the security questions to generate an encryption key and use the encryption key to encrypt the private key 918. The server may store the encrypted private key into the database 956.

Figure 10:
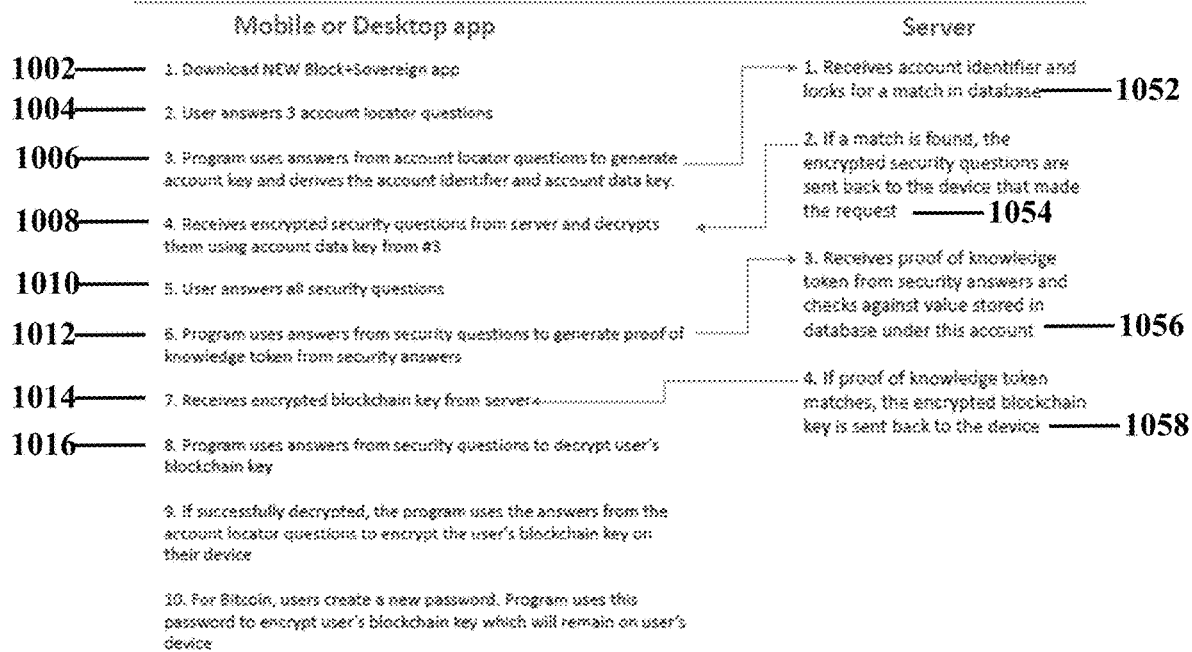
FIG. 10 illustrates a flow diagram of operations on a client device and a server during private key restore, according to an embodiment.

FIG. 10 illustrates a flow diagram 1000 of operations on the client device and the server during private key restore, according to an embodiment. The user associated with the client device may download and install the authentication application 1002 to communicate with the server. The user may answer the account locator questions 1004 via the application. The application running on the client device may use the account locator answers to generate the account key, which may be used to derive an account identifier and an account data key 1006. The server may receive the account identifier and if the account identifier matches any stored account identifier, the server may identify the user's account 1052. Upon authenticating the user's identifier, the server may send the encrypted security questions to the client device 1054. The client device may receive the encrypted security questions and decrypt them using the account data key 1008 via the application. The user may input answers to the security questions 1010. The application may use the answers to the security questions and the account key to generate a proof of knowledge token 1012 and send the token to the server. The server may receive the proof of knowledge token and check the received token against the token stored in the database 1056. If the received proof of knowledge token matches the stored token, the server may send the encrypted private key (e.g., blockchain key) to the client device 1058. The client device may receive the encrypted private key 1014. The application may use the answers to the security questions to generate the encryption key and use the encryption key to decrypt the encrypted private key 1016.

FIG. 11 illustrates a flow diagram 1100 of operations in a blockchain application, according to an embodiment. The user associated with the client device may open the application on the client device 1102. The user may answer the account locator questions via the application 1104. The application running on the client device may use the answers to the account locator questions to decrypt the user's encrypted blockchain key which resides on the client device 1106. The user's blockchain key may be a private key used to sign transactions on the blockchain enabling data to be encrypted and inserted onto the chain or conversely decrypted and extracted from the chain 1108.

FIG. 12 illustrates a flow diagram 1200 of operations in a crypto currency (e.g., bitcoin) application, according to an embodiment. The user operating the client device may open the application on the client device 1202. The user may insert a password via the application 1204. The application running on the client device may use the password to decrypt the user's encrypted blockchain key which resides on the client device 1206. The blockchain key may be a private key used to access the crypto currency (e.g., bitcoin) blockchain 1208.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
    establishing, by an application running on a client device, an entropic threshold based upon a request to protect one or more private keys;
    receiving, by the application running on the client device, a series of security questions and corresponding answers created by a user operating the client device, wherein each answer corresponds to a calculated entropy score, and wherein a total entropy score of the received answers is a sum of the calculated entropy score of each answer;
    generating, by the application running on the client device, a passphrase based on the received answers whose total entropy score satisfies the entropic threshold;
    encrypting, by the application running on the client device, the one or more private keys based on the passphrase;
    transmitting, by the application running on the client device, the series of security questions and the encrypted private keys to a server for storage into a database;
    transmitting, by the application running on the client device, a request to the server to access the one or more private keys;
    receiving, by the application running on the client device, the series of security questions and the encrypted private keys from the server;
    displaying, by the application running on the client device, each of the series of security questions on a graphical user interface of the client device;
    receiving, by the application running on the client device, an entered answer to each of the series of security questions from the client device;
    generating, by the application running on the client device, the passphrase based on the entered answers to the series of security questions; and
    decrypting, by the application running on the client device, the encrypted private keys based on the passphrase to obtain the one or more private keys.

2. The computer-implemented method of claim 1, further comprising:
    receiving, by the application running on the client device, answers to a set of account locator questions until an account locator entropic threshold is satisfied;
    generating, by the application running on the client device, an account key based on the answers to the set of account locator questions; and
    generating, by the application running on the client device, an account identifier and an account data key based on the account key, whereby the server identifies the user's account based on the account identifier.

3. The computer-implemented method of claim 2, wherein the series of security questions are encrypted using the account data key.

4. The computer-implemented method of claim 2, further comprising:
    generating, by the application running on the client device, a proof of knowledge token based on the account key and the entered answer to each of the series of security questions.

5. The computer-implemented method of claim 1, wherein the encrypted private keys are stored in a blockchain.

6. The computer-implemented method of claim 1, further comprising:
    upon receiving each security question and the corresponding answer,
        iteratively determining, by the application running on the client device, the total entropy score based on the received answers; and
    when the total entropy score does not satisfy the entropic threshold,
        iteratively requesting, by the application running on the client device, the user to create a new security question and a new corresponding answer until the total entropy score satisfies the entropic threshold.

7. The computer-implemented method of claim 1, further comprising:
    display, by the application running on the client device, a canvas on the graphical user interface to receive random shapes drawn by the user; and
    generating, by the application running on the client device, the one or more private keys based on the random shapes.

8. The computer-implemented method of claim 1, wherein the series of security questions are in a form of text sentence.

9. The computer-implemented method of claim 1, wherein the series of security questions are in a form of image.

10. The computer-implemented method of claim 1, further comprising:
generating, by the application running on the client device, an encryption key using a key stretching algorithm based on the passphrase; and
encrypting, by the application running on the client device, the one or more private keys using the encryption key.

11. A computer system comprising:
a client device; and
a server in communication with the client device;
wherein a processor of the client device executes an application configured to:
establish an entropic threshold based upon a request to protect one or more private keys;
receive an input of a series of security questions created by a user, wherein each answer corresponds to a calculated entropy score, a total entropy score of the received answers is a sum of the calculated entropy score of each answer;
generate a passphrase based on the received answers whose total entropy score satisfies the entropic threshold;
encrypt the one or more private keys based on the passphrase;
transmit the series of security questions and the encrypted private keys to the server for storage in a database;
receive from the server the series of security questions and the encrypted private keys;
upon accessing the one or more encrypted private keys,
display each of the series of security questions on a graphical user interface of the client device;
receive an entered answer to each of the series of security questions;
generate the passphrase based on the entered answers to the series of security questions; and
decrypt the encrypted private keys based on the passphrase to obtain the one or more private keys.

12. The computer system of claim 11, wherein the client device is further configured to:
receive answers to a set of account locator questions until an account locator entropic threshold is satisfied;
generate an account key based on the answers to the set of account locator questions; and
generate an account identifier and an account data key based on the account key, whereby the server identifies the user's account based on the account identifier.

13. The computer system of claim 12, wherein the series of security questions are encrypted using the account data key.

14. The computer system of claim 12, wherein the client device is further configured to:
generate a proof of knowledge token based on the account key and the entered answer to each of the series of security questions.

15. The computer system of claim 11, wherein the encrypted private keys are stored in a blockchain.

16. The computer system of claim 11, wherein the client device is further configured to:
upon receiving each security question and the corresponding answer,
iteratively determine the total entropy score based on the received answers; and
when the total entropy score does not satisfy the entropic threshold,
iteratively request the user to create a new security question and a new corresponding answer until the total entropy score satisfies the entropic threshold.

17. The computer system of claim 11, wherein the client device is further configured to:
display a canvas on the graphical user interface to receive random shapes drawn by the user; and
generate the one or more private keys based on the random shapes.

18. The computer system of claim 11, wherein the series of security questions are in a form of text sentence.

19. The computer system of claim 11, wherein the series of security questions are in a form of image.

20. The computer system of claim 11, wherein the client device is further configured to:
generate an encryption key using a key stretching algorithm based on the passphrase; and encrypt the one or more private keys using the encryption key.

* * * * *